United States Patent

[11] 3,568,768

[72] Inventor Cliva A. Rowell, Jr.
 Long Beach, Calif.
[21] Appl. No. 830,719
[22] Filed June 5, 1969
[45] Patented Mar. 9, 1971
[73] Assignee Cook Testing Company
 Long Beach, Calif.

[54] WELL PRESSURE RESPONSIVE VALVE
 21 Claims, 6 Drawing Figs.
[52] U.S. Cl. ................................................. 166/72,
 137/461, 137/509, 166/224
[51] Int. Cl. ........................................................ E21b 33/10,
 F16k 17/34
[50] Field of Search .......................................... 166/72, 73,
 224; 137/461, 484.4, 505.13, 509

[56] References Cited
UNITED STATES PATENTS

| | | | |
|---|---|---|---|
| Re25,109 | 1/1962 | Natho........................... | 166/72 |
| 2,635,626 | 4/1953 | Meynig.......................... | 137/461X |
| 2,935,998 | 5/1960 | Richardson ................... | 137/461X |
| 3,269,463 | 8/1966 | Page.............................. | 166/224 |
| 3,411,585 | 11/1968 | Page.............................. | 166/73 |

Primary Examiner—Ian A. Calvert
Attorney—Lyon & Lyon

ABSTRACT: A subsurface valve to control the flow of fluid in the bore of the well tubing. The valve has an operator which responds to control line pressure to cause a plug to seat in the bore tubing and prevent flow therethrough. The operator is maintained outside the bore and the plug is normally in a position offset from the bore. One form of the invention includes a movable sleeve for preventing movement of the plug toward seating position.

INVENTOR
CLIVA A. ROWELL, JR.
BY
Lyon & Lyon
ATTORNEYS

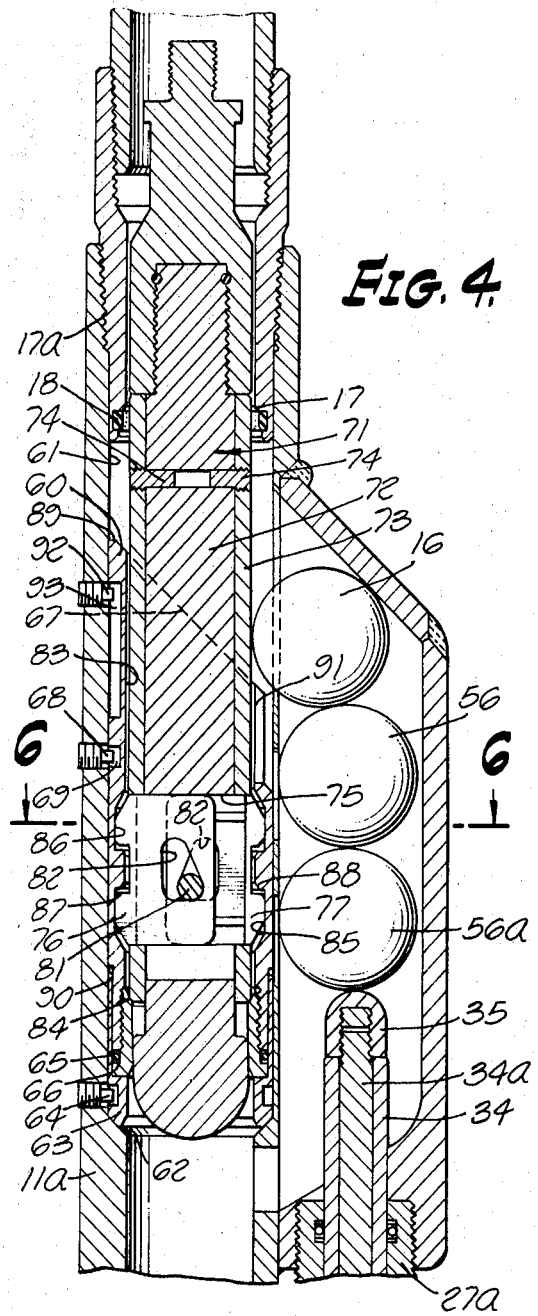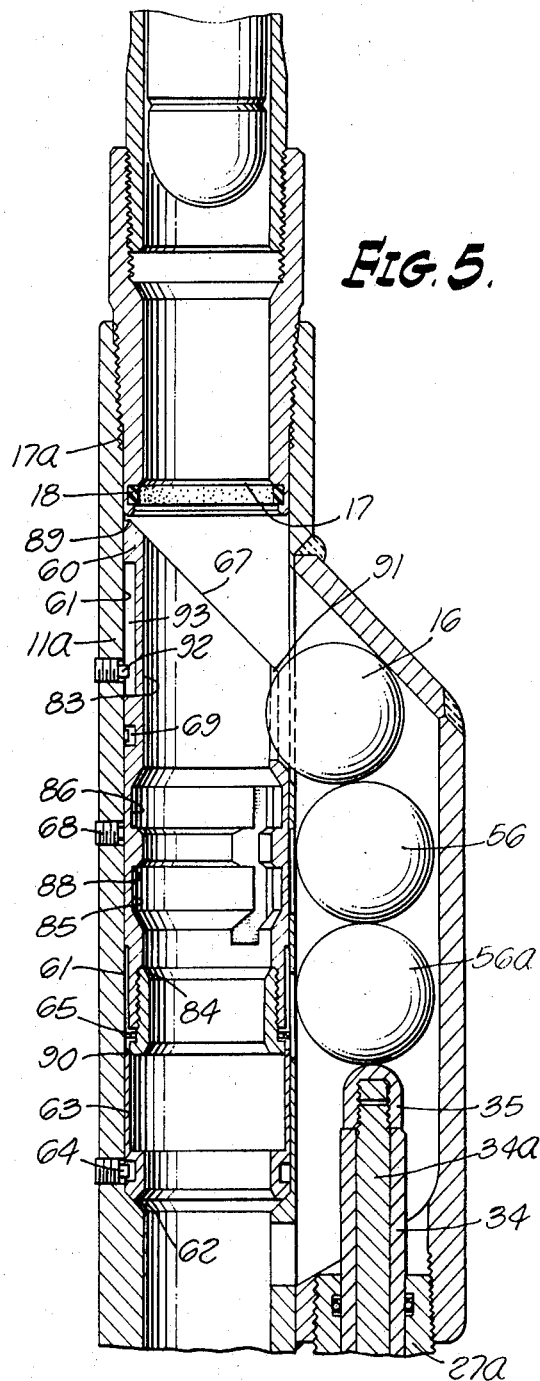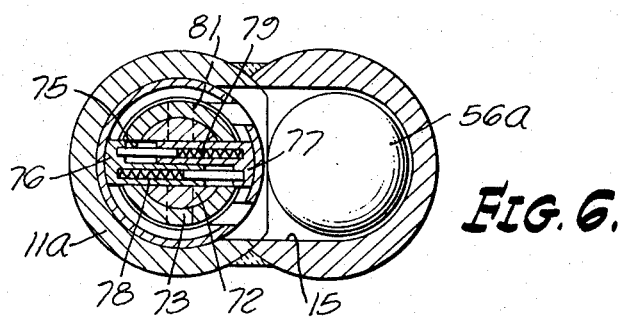
FIG. 4.
FIG. 5.
FIG. 6.
INVENTOR
CLIVA A. ROWELL, JR.
BY
ATTORNEYS

WELL PRESSURE RESPONSIVE VALVE

This invention relates to a fluid pressure responsive valve usable in wells, and more particularly, concerns the construction and operation of a valve which closes off flow in the bore of a well tubing when the pressure in the control line is decreased to a value below a predetermined range.

It is frequently necessary or desirable to control the upward flow of well fluid in the bore of the well tubing in such a manner as to pass the flow when the production line pressure remains within normal or predetermined levels, and to block such flow upon the occurrence of undesirably higher or lower pressure levels which could be caused by damage or malfunction of flow head or flow line equipment. This is accomplished by a safety pressure booster system at the surface that maintains a pressure in the control line to hold a valve open during normal operations and normal production line pressures. Several valve devices have been used in the past, each with varying degrees of success. Some of the past devices used, because of space limitations, found it necessary to house at least a portion of the valve within the bore, thereby causing an undesirable flow restriction in the bore. In addition, the operation and construction of several of these valve devices is such that frequent maintenance and repair has been required. Because of the inaccessibility of these valve devices, this maintenance and repair is very expensive and time consuming.

Therefore, it is an object of this invention to provide a subsurface device operated from the well surface which will control the flow of fluid in the bore of the well tubing above or below a predetermined range of pressures within the tubing, but which will not restrict fluid flow in the bore within the predetermined range of pressures. In accordance with this object, the valve device should allow for full bore opening when the valve is in an inoperative position. Furthermore, the device should be simple in operation and construction.

Another object is to provide a device of this type employing a movable sleeve for preventing movement of the plug toward closed position.

Other objects and advantages of the invention, as well as the details of illustrative embodiments, will be more fully understood by the following detailed description of the drawings.

Briefly, the invention includes a pressure-actuated operator which is housed outside the bore through which the well fluid flows. When pressure in the well tubing reaches a predetermined level, the control line pressure is decreased and the operator moves upward to cause a plug normally offset from the bore to be moved onto an annular seat in the bore to prevent the flow of the well fluid. Intermediate members, also normally offset from the bore, transmit force from the operator to the valve plug and maintain the plug in the seated position. In one form of the invention a movable sleeve blocks the plug in its offset position.

DESCRIPTION OF THE DRAWINGS

FIG. 4 is a longitudinal sectional view showing a modification, the opening tool for the blocking sleeve being shown in position.

FIG. 5 is a view similar to FIG. 4 showing the blocking sleeve in raised position following removal of the opening tool.

FIG. 6 is a transverse sectional view taken on line 6—6 of FIG. 4.

Figure 1:
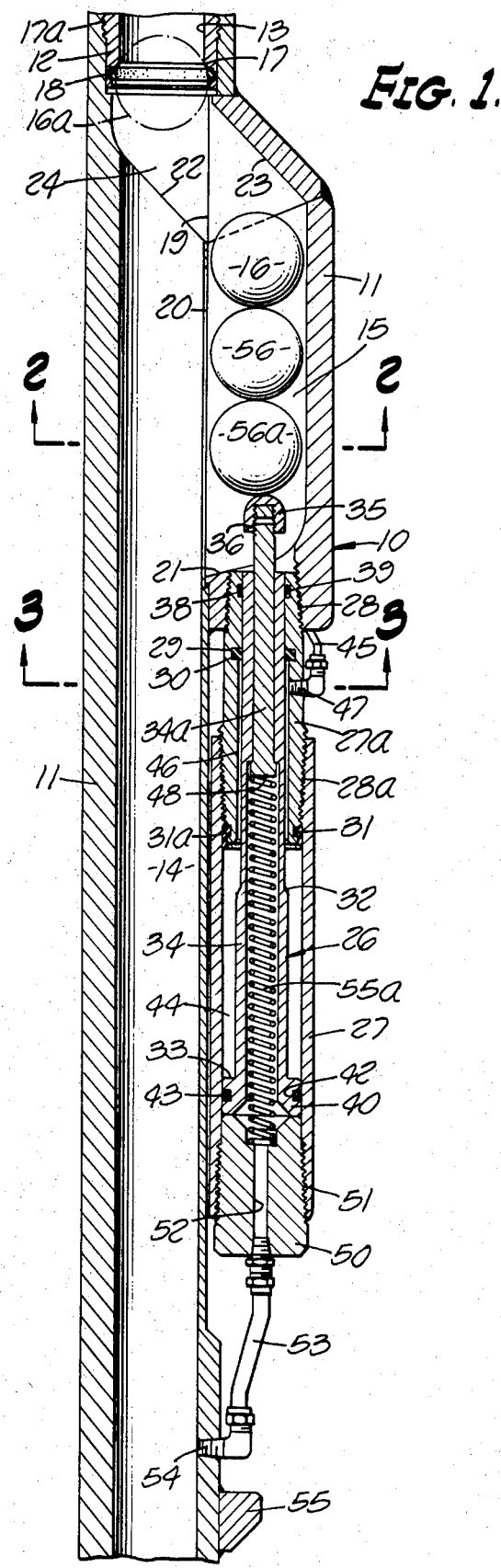
FIG. 1 is a vertical elevation sectioned to show the valve device in connection with a well tubing.
Figure 2:
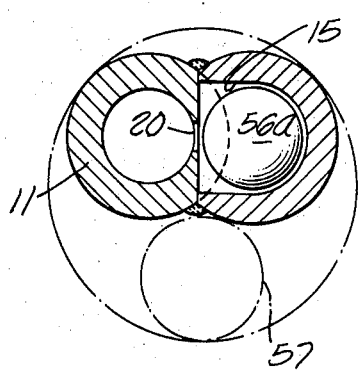
FIG. 2 is a sectional view taken on line 2—2 of FIG. 1.
Figure 3:
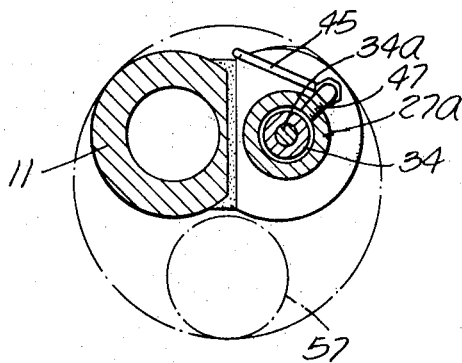
FIG. 3 is a sectional view taken on line 3—3 of FIG. 1.

Referring now in detail to FIGS. 1—3 of the drawings, the valve assembly generally designated 10, includes a valve body 11 which is connected to a well tubing 12 at any desired position within the well casing. Well or production fluid passes through the well tubing bore 13.

The valve body 11 includes a main passage or bore 14 in parallel alignment with the well tubing bore 13 and a side passage or pocket 15 offset from the well tubing bore 13. A plug 16, as seen in FIG. 1, is in the form of a ball and is carried by the valve body 11 for bodily movement between a down or open position in the side passage 15, as shown in full lines, and an up or closed position in the bore 14, shown by the broken lines 16a. An annular seat 17 is formed at the end of the well tubing 12 below a threaded interconnection 17a between the well tubing and the upper end of the valve body 11. The annular seat 17 is tapered to seat and annularly fit the plug 16 and includes a plastic or resilient ring 18 to seal the space between a seated plug 16 and the metallic seat 17.

An upper side opening or port 19 in the valve body 11 between the bore 14 and the side pocket 15 is sized to pass the ball plug 16 during its movement between the lower and unseated position and the upper and seated position. A lower side opening or port 20 in the form of an elongated slot provides for communication of the well fluid between the main passage 14 and the side passage 15 and thereby prevents sand buildup in the side pocket 15 by allowing the sand to be washed down the bore 14 by the well fluid. The lower wall of the side passage 15 is tapered downwardly at 21 to further facilitate the movement of the sand through the port or slotted opening 20 into the main passage 14.

A downwardly and laterally inclined ramp 22 in the bore and an upwardly tapered surface 23 at the upper end of the side passage 15 guide the ball plug during movement between the seated and unseated positions. The ramp 22 is formed by the transition between an enlarged diameter portion 24 in the valve body 11 and the passage 14 which has a diameter equal to the diameter of the well bore 13 and smaller than the diameter of the plug 16 thereby preventing the ball plug 16 from falling into the passage 14.

A fluid pressure responsive operator, generally designated 26, is housed substantially outside the valve body 11 in a pair of concentric sleeves 27 and 27a which are parallel to and offset from the bore 14. The upper end of sleeve 27a is threadably connected at 28 to the valve body 11 at the lower end of the side pocket 15. The lower end of sleeve 27a is threadably connected at 28a to the upper end of sleeve 27. The operator 26 is adapted to move upward in the side passage 15 and parallel to the main passage 14. The inner bore of the sleeve 27a is provided with a groove 29 to receive a seal member 30. A second groove 31 is formed at the lower end of the sleeve 27a within the sleeve 27 and receives a seal member 31a. Matching shoulders 32 and 33 on the operator 26 are adapted to engage the seal members 30 and 31a, respectively, when the operator 26 has moved to its uppermost position to provide secondary sealing between the operator 26 and the sleeves 27 and 27a. The operator 26 includes a hollow cylindrical piston member 34 concentrically mounted in the sleeves 27 and 27a, a telescoping member 34a positioned for limited axial movement within the upper end portion of the piston member 34 and a rounded nose portion 35 which extends beyond the sleeve 27 into the side passage 15. The nose portion 35 is threadably connected at 36 to the upper end of the telescoping member 34a. An annular groove 38 on the upper inner surface of the sleeve 27a receives an O-ring 39 to seal the upper portion of the piston member 34 to the sleeve 27a. The lower portion 40 of the piston member 34 is increased in diameter at 33 and the outer surface of the lower portion 40 slidably contacts the lower inner surface of the sleeve 27. The lower portion 40 of the piston member 34 has an annular groove 42 for receiving an O-ring 43 to seal the lower portion of the piston member 34 to the sleeve 27.

The shoulder 33 on the piston member 34 also provides a piston surface for exposure to a control fluid pressure which is communicated from the well surface by an auxiliary line 45. The control fluid pressure passes from the line 45 through a side inlet 47 in the sleeve 27a into an annular passage 46 between the upper portion of the piston member 34 and the lower inner surface of the sleeve 27a into a second annular passage 44 between the piston member 34 and the inner surface of the sleeve 27. The control pressure acts on the piston surface or shoulder 33 to effect downward movement of the operator 26. Production or well tubing pressure acts up on the surface area of the operator defined by the O-ring 43 and acts down on the surface area of the operator defined by the O-ring 39. The area of the piston surface defined by O-ring 43 is greater than the area of the piston surface within O-ring 39 and therefore the production fluid pressure acts to cause an upward movement of the operator 26. A cap member 50 is interconnected by threads 51 to the lower end of the sleeve 27. The sleeves 27 and 27a and the cap member 50 define a piston chamber. The cap member 50 includes a central opening 52 which communicates the production fluid pressure from a conduit 53 to the piston surface defined by O-ring 43. A side outlet 54 in the valve body 11 communicates production fluid pressure from the bore 14 to the conduit 53.

A flange member 55 located below the side outlet 54 extends radially outward from the valve body 11 to protect the conduit 53 when the well tubing is inserted into the well.

A spring 55a mounted axially within the hollow piston member 34 and between the lower end of the telescoping member 34a and the cap member 50 also acts on the piston surface 48 to assist in the upward movement of the operator 26.

The downward movement of the operator 26 is limited by the cap member 50 and the lower end of the sleeve 27 and the upward movement of the operator is limited by the lower end of sleeve 27a.

Intermediate members 56 and 56a, each in the form of a ball, are located between the underside of the ball 16 and the nose portion 35 of the operator 26. The present embodiment discloses the use of two intermediate members; however, it should be readily understood that one intermediate member could be used without detracting from the scope of the invention. The intermediate members 56 and 56a are also carried by the valve body 11 for bodily movement between a down position in the side pocket 15 and an up position in which intermediate member 56 extends partially within the bore 14 and intermediate member 56a remains outside the bore 14. The inclined ramp 22 and the guide surface 23 guide the intermediate member 56 during movement into the bore 14. The diameter of the intermediate member 56 like the ball plug 16 is also larger than the diameter of the bore 14 and therefore cannot fall into the bore 14.

The operation of the valve device is as follows:

At normal production fluid pressures, the ball plug 16 and the intermediate members 56 and 56a remain positioned in the side pocket 15 offset from the bore or main passage 14 to allow fluid in the well tubing 12 to flow freely without restriction through the main passage or bore 14 in the valve body 11. This is accomplished by a pressure booster system (not shown) located at the well surface which maintains the control line pressure at a higher pressure than the production line pressure. The ratio of production line pressure to control line pressure might range from 1:1¼ to 1:2 depending on the customer's needs. The pressure that the booster operates on is taken directly from the flowline at the surface so that on a 1:1½ ratio booster, if the flowline has a 1,000 p.s.i. flow pressure, the boosted pressure to the valve to hold it open would be 1,500 p.s.i. The booster system also includes under and overpressure pilot valves (not shown). The underpressure pilot valve is designed to vent the pressure control line whenever the production fluid pressure drops below a predetermined level and the overpressure pilot valve vents the control line whenever the production fluid pressure increases over a predetermined level. The operator 26 is held in a down position with the lower end of piston member 34 against the upper end of the cap 50 by the combination of the control fluid pressure acting downward on the piston surface 33, and the production fluid pressure in passage 15 acting downward on the surface area of the operator within the O-ring 39. When the well tubing or production fluid pressure increases or decreases beyond a predetermined level, the control line pressure is decreased as a result of the pressure pilot valves until the upward forces caused by the well tubing fluid pressure acting upward on the surface area of the operator defined by the O-ring 43 and the force of the spring 55a exceed the downward forces acting on the operator, at which time the operator 26 is moved upward and parallel to the main passage 14. The upward movement of the operator 26 causes a similar upward movement of the intermediate members 56 and 56a and the ball plug 16 with the intermediate members 56 and 56a transmitting the upward force of the operator 26 to the ball plug 16. Continued upward movement of the operator 26 forces the ball plug against the guide surface 23 which guides the plug 16 into the bore 14 and onto the valve seat 17. The intermediate member 56 is similarly moved against the guide surface 23 and continues to move upward along the guide surface 23 and into the bore 14 until it is stopped by the seated ball plug 16. The intermediate member 56 remains between and in contact with the intermediate member 56a and the ball plug 16, and the intermediate member 56a remains between and in contact with the operator 26 and the intermediate member 56 to transmit the upward parallel force exerted by the operator 26 to the ball plug 16 to move the ball plug upward into a seated position. Once the ball plug 16 is seated, the only force applied to the plug 16 other than that caused by the production line pressure is the force of the spring 55a transmitted by the telescoping member 34a through the intermediate members 56 and 56a. This spring force acts to maintain the ball plug 16 in the seated position. The seating of the ball plug 16 prevents the flow of well fluid through the bore 14 of the valve body 11 and into the well tubing 12. Thereafter, the valve may be reopened by pressuring down the well tubing 12 to overcome the upward forces applied to the ball and at the same time increasing the control fluid pressure to overcome the upward forces acting on the operator 26 until the operator 26 moves downward and the intermediate members 56 and 56a and ball plug 16 move downward and out of the flow stream into the side pocket 15.

It should be recognized that a parallel bypass well tubing 57 as shown by the broken lines in FIGS. 2 and 3 can be located in the well casing to allow well fluid to flow when the valve tubing 12 has been closed by the valve device 10. Also, a valve assembly similar to valve assembly 10 responding to the same or a different range of production fluid pressures can be connected into the well tubing 57.

This subsurface valve device operated from the well surface acts to control the flow of fluid in the well tubing. When the control line pressure is maintained within a predetermined range, the valve plug and operator are completely maintained outside the tubing bore thereby allowing a full bore opening to avoid restriction of well fluid flow and provide an uninterrupted straight line path of communication vertically through the valve assembly. The valve includes a minimum number of moving parts and is simple in both operation and construction.

In the modified form of the invention shown in FIGS. 4, 5 and 6, provision is made for installation of a blocking sleeve 60 to hold the ball plug 16 in the offset position and positively prevent it from moving upward to contact the valve seat 17. The valve body 11a is provided with an axial bore 61 below the valve seat 17 and extending to a taper shoulder 62. A tubular shoe 63 is originally installed to rest on the shoulder 62 and is held in place by means of a shear pin 64. The blocking sleeve 60 is also originally positioned within the bore 61 and the lower end of this blocking sleeve 60 is received within the interior of the shoe 63. An expanding split ring 65 is carried in a groove 66 near the lower end of the blocking sleeve 60. The purpose of this split ring 65 is described below.

When the blocking sleeve 60 is in the original position shown in FIG. 4, the upper angular surface 67 thereof is positioned at a sufficiently low elevation so as not to interfere with movement of the ball plug 16 from its retracted offset position to its position engaging the seat 17. The shear pin 68 on the valve body 11a projects into a recess 69 on the blocking sleeve 60 to hold it in position. Production fluid flows upward through the interior of the blocking sleeve 60. The device of the modification of FIGS. 4, 5 and 6 then operates in the same manner as described above in connection with the form of the invention shown in FIGS. 1—3. When the blocking sleeve 60 is in the position shown in FIG. 4, and before the tool assembly 71 is lowered into position, the inclined surface 67 guides the ball plug 16 from the inoperative offset position to the position concentric with the seat 17.

If for any reason it should be desired to lock the ball plug 16 in its offset inoperative position and to positively prevent movement into sealing position on the seat 17, the blocking sleeve 60 is lifted from the position shown in FIG. 4 to the position shown in FIG. 5. This lifting action is accomplished by means of a tool assembly generally designated 71 lowered through the tubing on a wire line, not shown, or hydraulically forced down through the tubing. This opening tool includes a mandrel 72 slidably mounted within a shell 73 and connected to the shell by means of shear pins 74. A transverse slot 75 slidably receives a pair of oppositely directed dogs 76 and 77 each urged outward by means of springs 78, 79, respectively. A cross pin 81 is carried by the shell 73 and extends through he mandrel 72 and through triangular apertures 82 provided in the lugs 76 and 77.

When the tool assembly 71 is lowered through the tubing and into the valve body 11a, it enters the interior of the blocking sleeve 60, the outer ends of the dogs 76 and 77 dragging along the interior bore 83 of the blocking sleeve 60. Downward movement of the tool assembly 71 is arrested by contact of the shoulder 84. The dogs 76 and 77 move outward under force of the springs 78 and 79 to enter the internal grooves 85 and 86 in the blocking sleeve 60. The parts are then in the position shown in FIG. 4.

In order to raise the blocking sleeve 60 to the position shown in FIG. 5, the tool assembly 71 is lifted upward, to bring the shoulders 87 on the dogs into engagement with the downward facing shoulder 88. Continued upward movement of the tool assembly 71 breaks the shear pins 68 and brings the extreme upper end 89 into contact with the lowermost portion of the seat 17. Continued upward movement of the tool assembly 71 breaks the shear pins 74, lifting the mandrel 72 with respect to the shell 73 and causing the cross pin 81 to retract the dogs 76 and 77 against the action of the springs 78 and 79. As thus retracted, the dogs pass through the interior bore 83 of the blocking sleeve 60 and the tool assembly 71 is withdrawn upwardly to the surface. The split expanding ring 65 expands outward to contact the bore 61 in the valve body 11a, thereby overlying the upper end 90 of the shoe 63, thereby holding the blocking sleeve 60 in its uppermost position. In this position, as shown in FIG. 5, the ball plug 16 contacts a relatively narrow slot 91 formed in the upper portion of the blocking sleeve 60 and this slot 91 is too narrow to allow movement of the ball plug 16 radially inwardly. Flow of production fluid then takes place through the interior of the blocking sleeve 60 and there is no possibility of the ball plug 16 moving into contact with the seat 17. Rotation of the blocking sleeve 60 with respect to the valve body 11a is prevented by engagement of the key 92 within the keyway 93.

In other respects, the modified apparatus shown in FIGS. 4—6 is the same as that previously described in connection with FIGS. 1—3.

I claim:

1. A valve to control the flow of fluid in the bore of a well tubing, comprising: a valve body connectable in the well tubing string; said valve body having a main passage in alignment with the bore of the well tubing and a side passage offset from said main passage; a valve seat concentric with said main passage; said valve body housing a plug and at least one intermediate member; said plug adapted to move between said side passage and a seated position concentric with said main passage; said valve body having guide means to guide said plug during movement of said plug; said guide means including a ramp proximate said side passage to guide said plug during movement into said side passage, said ramp being downwardly and laterally inclined with respect to said main passage; said intermediate member being adapted to move in said side passage; pressure responsive operator means offset from said main passage and adapted to move into said side passage to effect movement of said plug and said intermediate member; and said intermediate member being maintained in operable contact and between said plug and said operator means to transmit the force exerted by said operator means to said plug when said plug is moved to the seated position.

2. A valve to control the flow of fluid in the bore of a well tubing, comprising: a valve body connectable in the well tubing string; said valve body having a main passage in alignment with the bore of the well tubing and a side passage offset from said main passage; a valve seat concentric with said main passage; said valve body housing a plug and at least one intermediate member; said plug adapted to move between said side passage and a seated position concentric with said main passage; said valve body having guide means to guide said plug during movement of said plug; said guide means including a guide surface at the upper side of said passage to guide said plug during movement from said side passage, said guide surface being upwardly and laterally inclined with respect to said main passage; said intermediate member being adapted to move in said side passage; pressure responsive operator means offset from said main passage and adapted to move into said side passage to effect movement of said plug and said intermediate members; and said intermediate member being maintained in operable contact between said plug and said operator means to transmit the force exerted by said operator means to said plug when said plug is moved to the seated position.

3. A valve to control the flow of fluid in the bore of a well tubing, comprising: a valve body connectable in the well tubing string; said valve body having a main passage in alignment with the bore of the well tubing and a side passage offset from said main passage; a valve seat concentric with said main passage; said valve body housing a plug and at least one intermediate member, said intermediate member being in the form of a ball; said plug adapted to move between said side passage and a seated position concentric with said main passage; said intermediate member being adapted to move in said side passage; pressure responsive operator means offset from said main passage and adapted to move into said side passage to effect movement of said plug and said intermediate member; and said intermediate member maintained in operable contact and between said plug and said operator means to transmit the force exerted by said operator means to said plug when said plug is moved to the seated position.

4. The device of claim 3 wherein said valve body is provided with guide means to guide said plug during movement of said plug.

5. The device of claim 3 wherein said operator means includes first piston surfaces located for exposure to control fluid pressure to effect movement of said operator means in one direction and second piston surfaces located for exposure to production fluid pressure to effect movement of said operator means in the opposite direction.

6. The device of claim 5 wherein means are provided defining a piston chamber, said first and second piston surfaces are maintained within said piston chamber, and said operator means moves axially within said piston chamber.

7. The device of claim 6 wherein said piston chamber is in parallel alignment with said side passage and said means defining said piston chamber are connected to said valve body.

8. The device of claim 5 wherein means are provided to communicate control fluid pressure from the well surface to said first piston surfaces.

9. The device of claim 5 wherein means are provided to communicate production fluid pressure from the well tubing to said second piston surfaces.

10. The device of claim 3 wherein said plug is in the form of a ball having a diameter greater than the diameter of the bore of the well tubing.

11. The device of claim 3 wherein two intermediate members are used and each is in the form of a ball.

12. A valve to control the flow of fluid in the bore of a well tubing, comprising: a valve body connectable in the well tubing string; said valve body having a main passage in alignment with the bore of the well tubing and a side passage offset from said main passage; a valve seat concentric with said main passage; said valve body housing a plug and at least one intermediate member; said plug adapted to move between said passage and a seated position concentric with said main passage; said intermediate member being adapted to move in said side passage; pressure responsive operator means offset from said main passage and adapted to move into said side passage to effect movement of said plug and said intermediate member; said operator means including a piston member, a telescoping member positioned for axial movement within said piston member and a nose portion connected to said telescoping member, said piston member having first piston surfaces located for exposure to a control fluid pressure to effect movement of said operator means in one direction and second piston surfaces located for exposure to production fluid pressure to effect movement of said operator means in the opposite direction and said nose portion extending into said side passage; and said intermediate member being maintained in operable contact and between said plug and said operator means to transmit the force exerted by said operator means to said plug when said plug is moved to the seated position.

13. The device of claim 12 wherein means connected to said valve body are provided defining a piston chamber outside said valve body, said piston chamber is in parallel alignment with said side passage and offset from the well tubing bore, and said first and second piston surfaces are contained within said piston chamber.

14. The device of claim 13 wherein spring means are provided within said means defining said piston chamber to assist in the movement of said operator means into said side passage.

15. The device of claim 14 wherein said spring means act on said telescoping member to transmit a spring force on said plug when said plug is in a seated position.

16. The device of claim 12 wherein first means are provided to communicate control fluid pressure from the well surface to said piston chamber and second means are provided to communicate production fluid pressure from the well tubing bore to said piston chamber.

17. A subsurface valve to control the flow of fluid in the bore of a well tubing, comprising: a valve body connectable in the well tubing string; said valve body having a main passage in alignment with the bore of the well tubing, a downward facing valve seat concentric with said main passage, a side passage offset from said main passage, and a ramp joining said main passage and said side passage; a first ball moveable from said side passage on said ramp to close on said valve seat; and a second ball positioned below said first ball and in contact therewith moveable from said side passage onto said ramp while maintaining contact with said first ball; and means for moving said first and second balls.

18. A valve to control the flow of fluid in the bore of a well tubing, comprising: a valve body connectable in the well tubing string and having a main passage in alignment with the bore of the well tubing and a side passage offset from said main passage, a downward facing seat in the valve body in alignment with the main passage and positioned above the upper end of the side passage, a plug moveable from a position within the side passage to a position to engage the seat to prevent upward flow of fluid, pressure responsive means offset from said main passage for effecting such movement of said plug, and selectively operable means for preventing movement of said plug into contact with said seat, said means including a blocking element movably mounted in said main passage and moveable upward from an inoperative position to an operative position, said blocking element in operative position having a portion blocking the path of movement of said plug to prevent it from moving into engagement with said seat.

19. The device of claim 18 in which the plug comprises a ball.

20. The device of claim 18 in which the blocking element comprises a sleeve having an inclined ramp at its upper end for guiding the plug toward the seat.

21. The device of claim 20 in which means are provided for preventing rotation of the blocking sleeve within the valve body.